Patented May 2, 1933

1,906,231

UNITED STATES PATENT OFFICE

MAX ALBERT KUNZ, OF MANNHEIM, AND HEINRICH NERESHEIMER AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

VAT DYESTUFFS OF THE PYRANTHRONE SERIES

No Drawing. Application filed December 14, 1929, Serial No. 414,245, and in Germany December 15, 1928.

The present invention relates to the manufacture of vat dyestuffs of the pyranthrone series.

We have found that hydroxypyranthrones are obtained by treating 1.1'-dianthraquinonyl-2.2'-dialdehydes with anhydrous sulphuric acid and reducing agents at temperatures above about 50° C. As reducing agents preferably metals, such as copper, zinc and aluminium or mixtures or alloys of metals are employed, but also other reducing agents, such as for example hydrazine, may be used. According to the kind of the reducing agent and the special working conditions, in particular as regards the temperature employed, either monohydroxy or dihydroxy derivatives of pyranthrone are obtained. The reaction probably proceeds according to the following formulae:

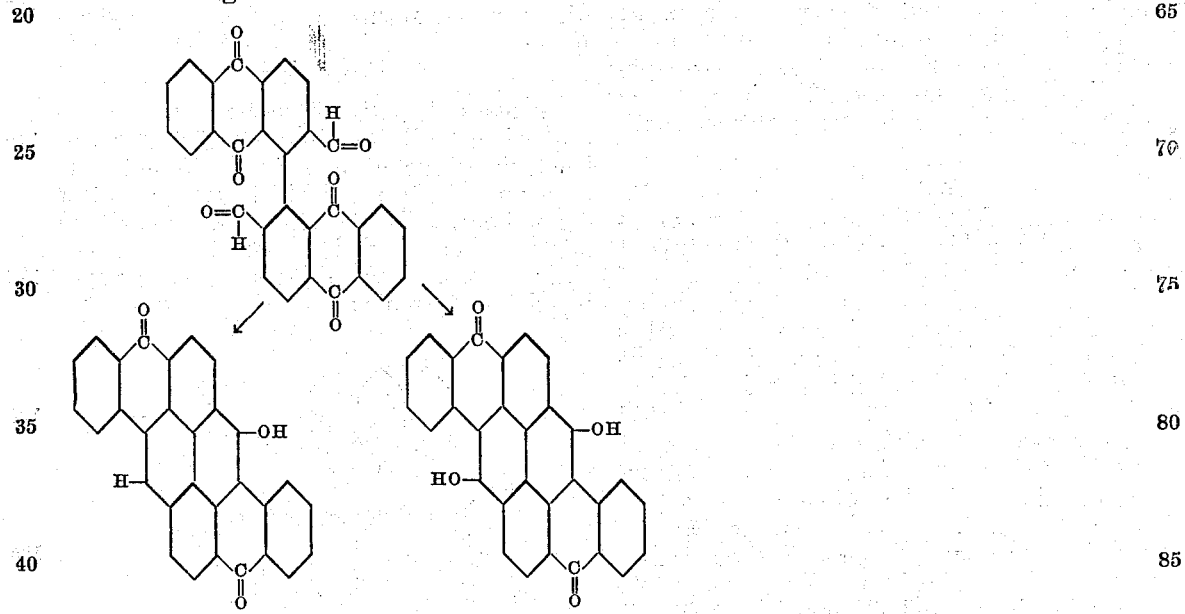

The products are Bz-monohydroxy-, and Bz.Bz'-dihydroxy-pyranthrones.

Instead of the said dialdehydes the corresponding carboxylic acids or derivatives thereof, such as for example the phenyl esters of the carboxylic acids, or omega-omega'-tetra- or hexahalogen-2.2'-dimethyl-1.1'-dianthraquinonyls may be employed as starting materials which are saponified to the said aldehydes and carboxylic acids respectively by the sulphuric acid.

The hydroxypyranthrones thus obtained are not suitable for dyeing purposes since they are sensitive to the action of alkalies. Very valuable dyestuffs are, however, produced by substituting according to known methods the hydrogen atoms on the oxygen atoms by alkyl, aralkyl, aryl or aroyl groups, that is to say by esterification or etherification of the hydroxy groups.

The following examples will further illustrate the nature of this invention, but the invention is not restricted to this example. The parts are by weight.

Example 1

47 parts of 1.1'-dianthraquinonyl-2.2'-dialdehyde are dissolved at ordinary temperature in 500 parts of concentrated sulphuric acid. After the addition of 15 parts of copper bronze the whole is stirred for 1 hour at ordinary temperature, and is then heated at from 40° to 50° C. until the solution has become pure blue in color. The reaction liquid is freed from unchanged copper bronze by filtration, poured into ice-cooled water and the precipitate filtered off and dried. The reaction product obtained which is an orange red paste and an orange red powder when dry, dissolves in alkali solution and in concentrated sulphuric acid giving blue colorations and dyes cotton from a blue vat blue colored shades which change to red with acid. The analysis of the reaction product crystallized from nitrobenzene gives results which agree with dihydroxypyranthrone.

The same product is also obtained by reducing the phenyl ester of 1.1'-dianthraquinonyl-2.2'-dicarboxylic acid by means of an alkaline solution of hydrosulphite at about 20° C.

Example 2

76 parts of omega-omega'-tetrabromo-2.2'-dimethyl-1.1'-dianthraquinonyl are introduced while stirring at from 40° to 45° C. into a suspension of 40 parts of copper chips in 1000 parts of concentrated sulphuric acid. The temperature slowly rises. The whole is heated to from 70° to 75° C. and is kept at this temperature until the solution has become pure blue in color. The whole is then worked up as described in Example 1. The hydroxy-pyranthrone which is formed as the main reaction product corresponds in its properties with the reaction product obtainable according to Example 1. Allo-ms-naphthodianthrone, ms-anthradianthrone and mono-hydroxypyranthrone are formed as by-products.

Example 3

50 parts of the Bz.Bz'-dihydroxypyranthrone obtainable according to Example 1 are ground in a ball mill with 200 parts of nitrobenzene and 50 parts of potash for several hours. The suspension thus obtained is then diluted with 300 parts of nitrobenzene and slowly heated to boiling while stirring after the addition of 50 parts of the methyl ester of p-toluene sulphonic acid and kept at the said temperature for one hour. The reaction mixture is then allowed to cool to about 100° C., whereupon again 25 parts of potash and 25 parts of the methyl ester of p-toluene sulphonic acid are added, the whole being then heated to boiling and kept thereat until a sample is not any more sensitive against alkali, that is to say, its color is not any more changed to blue by the addition of alkali. The whole is then allowed to cool and worked up in the usual manner. The Bz.Bz'-dimethoxypyranthrone corresponding to the formula:

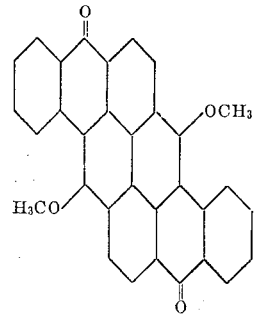

thus obtained is an orange powder crystallizing in needles, dissolves in concentrated sulphuric acid to give a blue solution and dyes cotton from a violet vat strong golden orange shades of very good fastness.

The Bz.Bz'-diethoxypyranthrone obtainable in an analogous manner from dihydroxypyranthrone by means of the ethyl ester of p-toluene sulphonic acid with the aid of alkalies, likewise forms orange needles and has similar tinctorial and fastness properties to those of the dimethoxy derivative.

The dibenzyl ether of Bz.Bz'-dihydroxypyranthrone having similar properties is obtained by the action of the benzyl ester of p-toluene sulphonic acid on the dihydroxypyranthrone.

Instead of the methyl ester of p-toluene sulphonic acid other alkylating agents may be employed for the alkylation of Bz.Bz'-dihydroxypyranthrone. Thus for example the aforedescribed dimethyl ether is obtained by treating an alkaline solution of Bz.Bz'-dihydroxypyranthrone with dimethylsulphate.

Example 4

100 parts of Bz.Bz'-dihydroxypyranthrone are boiled while stirring with 500 parts of benzoylchloride until a sample is not anymore sensitive to alkali which is the case after a few hours. The reaction mixture is then allowed to cool and the separated Bz.Bz'-dihydroxypyranthrone d-benzoate corresponding to the formula:

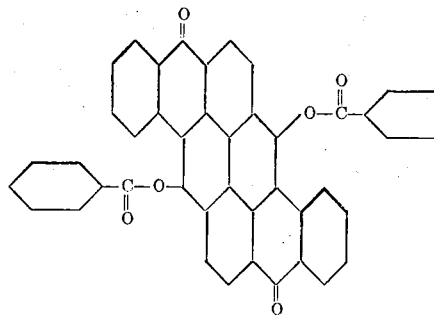

filtered off. It crystallizes in orange needles, dissolves in concentrated sulphuric acid to give a blue solution with a red tinge and dyes cotton golden orange shades.

Analogous reaction products are obtained by means of p-chlorobenzoylchloride and meta-methoxybenzoylchloride.

Example 5

44 parts of Bz.Bz'-dihydroxypyranthrone are warmed at between 90° and 100° C. in alkaline solution with sodiumhydrosulphite until the initially blue solution has turned red violet and a sample furnishes gray violet dyeings in contradistinction to the blue shades obtained with the initial material. The reaction mixture is then allowed to cool and the Bz.monohydroxypyranthrone precipitated by passing a current of air through the solution, the reaction product being then filtered off, washed until neutral and dried. The Bz.monohydroxypyranthrone dyes gray violet shades from a red violet vat and its sodium salt is olive green.

Example 6

10 parts of Bz.monohydroxypyranthrone are suspended in 200 parts of trichlorobenzene and the suspension slowly heated to between 180° and 200° C. after the addition of 10 parts of calcined potash and 5 parts of the methyl ester of p-toluene sulphonic acid the reaction mixture being kept at the said temperature for about one hour. The reaction mixture is then allowed to cool, whereupon again 5 parts of the said ester are added, the temperature being again raised to between 180° and 200° C. and kept thereat until the reaction product is not any more sensitive to alkali. The reaction mixture is then worked up as described in Example 3. The Bz.monomethoxypyranthrone obtained is a brown red powder, dissolves in concentrated sulphuric acid to give a violet solution and dyes cotton from a violet vat red brown shades of very good fastness.

Dyestuffs of similar properties are obtained by employing, for example, the chloroethyl ester or the methyl glycol ester of p-toluene sulphonic acid instead of the corresponding methyl ester.

What we claim is:

1. Derivatives of pyranthrone corresponding to the formula:

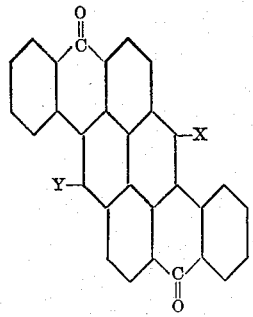

in which at least one of the positions X and Y is substituted by oxygen to which a radicle selected from the group consisting of alkyl, aralkyl, aryl, and aroyl radicles, is attached.

2. Derivatives of pyranthrone corresponding to the formula:

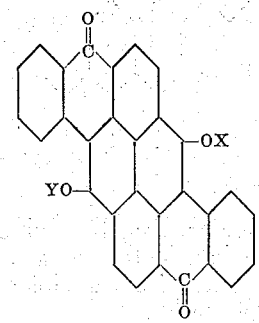

in which X and Y are radicles selected from the group consisting of alkyl, aralkyl, aryl and aroyl radicles.

3. Derivatives of pyranthrone corresponding to the formula:

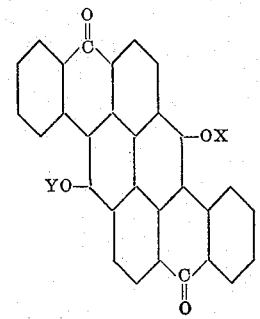

in which X and Y are alkyl radicles, the said derivatives dissolving in concentrated sulphuric acid to give blue violet solutions and dyeing cotton orange to red orange shades from violet vats.

4. Bz.Bz'-dimethoxypyranthrone corresponding to the formula:

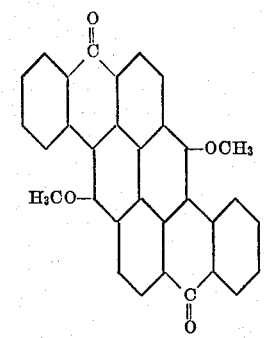

dissolving in concentrated sulphuric acid to give a blue solution and dyeing cotton from a violet vat strong golden orange shades.

5. Bz.Bz'-diethoxy-pyranthrone corresponding to the formula:
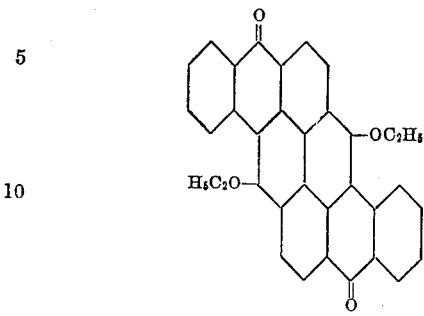
forming orange needles, dissolving in concentrated sulphuric acid to give a blue solution and dyeing cotton from a violet vat strong golden orange shades.
In testimony whereof we have hereunto set our hands.
MAX ALBERT KUNZ.
HEINRICH NERESHEIMER.
KARL KOEBERLE.